Dec. 30, 1969
P. BODET
3,486,321
SYSTEM FOR SYNCHRONIZING A CLOCKWORK
PENDULUM WITH A REFERENCE FREQUENCY
Filed July 31, 1967
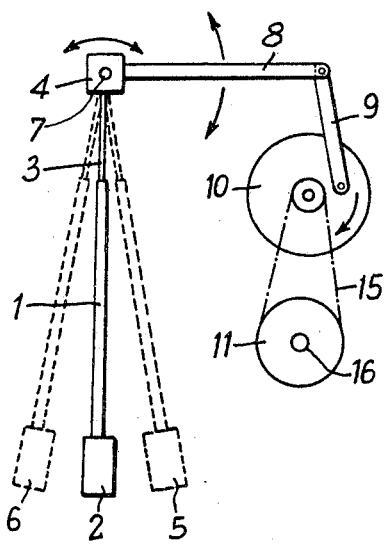
INVENTOR
PIERRE BODET
BY Young + Thompson
ATTYS.

United States Patent Office 3,486,321
Patented Dec. 30, 1969

---

3,486,321
SYSTEM FOR SYNCHRONIZING A CLOCKWORK PENDULUM WITH A REFERENCE FREQUENCY
Pierre Bodet, Trementines, Maine-et-Loire, France
Filed July 31, 1967, Ser. No. 657,271
Claims priority, application France, Sept. 19, 1966, 76,753; Oct. 11, 1966, 79,465
Int. Cl. G04c 3/02
U.S. Cl. 58—30                                   1 Claim

ABSTRACT OF THE DISCLOSURE

The pendulum which oscillates normally in cooperation with its escapement is synchronized with a reference frequency such as a submultiple of the mains frequency. To this end, the support to which the pendulum is suspended is subjected to the mechanical pulses produced at its own frequency by a transmission such as a gearing controlled by a synchronous motor fed by the mains and acting on the pivotal support to which the pendulum is suspended.

---

My invention has for its object to ensure the synchronization of a pendulum or pendular balance controlling a clockwork with a predetermined frequency approximating the natural frequency of the pendulum and in particular it has for its object to synchronize said pendulum with a sub-multiple of the frequency of A.C. mains. The use of an escapement associated with such a pendulum allows maintaining through short pulses the oscillations of the said pendulum, which escapement forms the conventional means for operating a clockwork incorporating a pendulum as a balance.

Now, the period of a pendulum which is a function of the length of the latter is subjected to the influence of the heat expansion of the pendulum-carrying rod, of the possible hardening of the oil lubricating the gears or again of a more or less accurate adjustment of the height of the adjusting mass carried by said rod. A clockwork including such a pendulum may thus be subjected to a lead or to a lag by such causes of error.

On the other hand, it is possible to resort to the frequency of the electric current which is generally of 50 or 60 cycles according to the country and if, at certain moments, said frequency varies, its variations are always compensated with time in a manner such that the average frequency remains during a sufficiently long period equal to a predetermined value. Said frequency may therefore control the progression of the hands of a clock through the agency of a mere synchronous motor, but in such a case the clock would stop each time the current fails.

My invention has for its object a synchronizing system resorting to the reference frequency provided by A.C. mains or to any other frequency of a constant average value with a view to ensuring the synchronous operation of a pendulum and thereby to cutting out the action of the above-mentioned causes of error.

To this end, my invention has for its more specific object an arrangement for synchronizing the pendulum of a clockwork with a current the average frequency of which is in a well-defined ratio with reference to the synchronizing frequency.

According to my invention, there is provided a transmission mechanism controlled by said reference frequency and subjecting the pendulum to mechanical pulses at the synchronizing frequency, so as to adjust the frequency of the pendulum in accordance with the reference frequency, any possible lack of pulses arising whenever the synchronizing current is cut out allowing the pendulum to oscillate at its natural frequency.

I will now describe, by way of example and in a non-limiting sense, a preferred embodiment of my invention. The single figure of the accompanying drawing is a front view of a pendulum synchronized through the agency of an electric motor fed by the mains and of a movable support associated with the suspension of the pendulum.

The conventional pendulum constituted by a rod 1, an adjusting mass 2 and a spring blade 3 is fitted through the end of the latter inside a support 4 adapted to pivot around the axis. The support 4 is rigid with one end of the arm 8 pivotally secured at its other end to one end of a link 9 the opposite end of which is pivotally secured to a disc 10 adapted to be driven into rotation, through the agency of a speed-reducing gear illustrated diagrammatically by its casing 15, by the shaft 16 of a synchronous motor 11 the speed of which is proportional to the frequency of the mains. If the arm 8 is held at a standstill the pivotal support 4 remains stationary and the pendulum 1–2–3 oscillates between the positions 5 and 6 as allowed by the flexibility of the spring 3, the oscillations being sustained in a conventional manner by an escapement which is not illustrated. The speed reduction between the motor 11 and the disc 10 is such that the rotation of the motor acting through the agency of the link 9 causes the arm 8 and consequently also the pivotal support 4 to oscillate at a frequency defined by the frequency of the mains. Said frequency is thus equal to the theoretical frequency of the pendulum 1, 2, 3 of which the pendular movement is sustained by the escapement. The oscillations of the support 4 and those of the pendulum are synchronous through the very structure of the arrangement, but the pendulum may be shifted slightly out of synchronism under the action of the slight causes of error mentioned hereinabove. Now, as already mentioned, the oscillations of the support 4 are transmitted to the pendulum through the spring 3 in a manner such that the pendulum is synchronized with the oscillations of the support 4 in the same manner as a synchronous motor is synchronized with the frequency of the feed current. In other words, the pendulum 2 oscillates in synchronism with the period of oscillation of its support 4 and consequently with the rotary movement of the disc 10, the number of revolutions of which is a submultiple of the reference frequency, that is of the frequency of the mains.

If the current fails, the disc stops rotating and the arm 8 and support 4 oscillate no longer. At this moment, the pendulum oscillates after the manner of a conventional pendulum secured to a stationary support. Consequently, the operation of the pendulum does not stop and only its synchronization with the mains is no longer ensured.

When the current is restored, the disc 10 revolves again. The support 4 starts oscillating and restores the synchronization with the reference frequency.

It should be remarked that this oscillation of the support 4 may begin even without being in phase with the oscillations of the pendulum 1, 2, 3 since after a number of oscillations, the spring 3 sets gradually the pendulum in phase with the movement of the support 4 and at such a moment the pendulum is and remains synchronized with the oscillation of the support 4.

My invention covers thus any arrangement adapted to give the pendulum slight mechanical pulses adapted to keep it in phase with the synchronizing mass, while allowing said pendulum to operate independently whenever the synchronizing means stop acting, the return into phase being obtained automatically when the synchronizing means start again.

What I claim is:

1. A pendulum driven clockwork system comprising a pendulum, a pivotal support, an escapement engaging the said pendulum independently of said pivotal support, a spring through which the pendulum is suspended to the pivotal support, a synchronous motor operating at a reference frequency, transmitting means controlled by said motor and adapted to drive the pivotal support to impart motion to the said pendulum at a synchronizing frequency which is in a constant ratio with said reference frequency.

References Cited

UNITED STATES PATENTS

| | | |
|---|---|---|
| 2,000,307 | 5/1935 | Van Osdel. |
| 2,241,447 | 5/1941 | Demonet. |
| 2,617,247 | 11/1952 | Punzak. |

RICHARD B. WILKINSON, Primary Examiner

EDITH C. SIMMONS, Assistant Examiner

U.S. Cl. X.R.

58—129